(12) United States Patent
Gstach et al.

(10) Patent No.: US 8,753,056 B2
(45) Date of Patent: Jun. 17, 2014

(54) THREAD-TAPPING CONCRETE SCREW

(75) Inventors: Peter Gstach, Schaan (LI); Michael Beckert, Diepoldsau (CH); Tobias Neumaier, Rankweil (AT)

(73) Assignee: Hilti Aktiengesellschaft, Schaan (LI)

( * ) Notice: Subject to any disclaimer, the term of this patent is extended or adjusted under 35 U.S.C. 154(b) by 181 days.

(21) Appl. No.: 13/068,377

(22) Filed: May 10, 2011

(65) Prior Publication Data
US 2011/0274516 A1 Nov. 10, 2011

(30) Foreign Application Priority Data

May 10, 2010 (DE) .......................... 10 2010 028 824

(51) Int. Cl.
*F16B 25/02* (2006.01)
*F16B 25/00* (2006.01)

(52) U.S. Cl.
CPC ......... *F16B 25/0084* (2013.01); *F16B 25/0026* (2013.01)
USPC ........................................ 411/387.4; 411/420

(58) Field of Classification Search
USPC ................ 411/386–387.8, 420, 421
See application file for complete search history.

(56) References Cited

U.S. PATENT DOCUMENTS

| | | | | | |
|---|---|---|---|---|---|
| 3,125,923 | A | * | 3/1964 | Hanneman | 411/386 |
| 3,738,218 | A | * | 6/1973 | Gutshall | 411/387.7 |
| 3,747,143 | A | * | 7/1973 | Eager | 470/9 |
| 3,780,389 | A | | 12/1973 | Lindstrom | 10/10 R |
| 3,789,725 | A | * | 2/1974 | Lindstrom | 411/387.7 |
| 4,147,088 | A | * | 4/1979 | Whittaker, Jr. | 411/387.8 |
| 4,241,639 | A | * | 12/1980 | Baer | 411/387.8 |
| 4,673,323 | A | * | 6/1987 | Russo | 411/107 |
| 4,978,350 | A | * | 12/1990 | Wagenknecht | 606/312 |
| 5,120,172 | A | * | 6/1992 | Wakai | 411/387.8 |
| 5,667,348 | A | * | 9/1997 | Chen et al. | 411/420 |
| 5,755,542 | A | | 5/1998 | Janusz et al. | 411/387 |
| 6,106,208 | A | * | 8/2000 | Lin | 411/418 |
| 8,353,655 | B2 | * | 1/2013 | Rainer | 411/387.1 |
| 2008/0124188 | A1 | | 5/2008 | Chang et al. | 411/387.8 |

FOREIGN PATENT DOCUMENTS

| | | |
|---|---|---|
| EP | 1 795 768 B1 | 10/2008 |
| GB | 654422 | 6/1951 |
| JP | 2008 256093 A | 10/2008 |

* cited by examiner

*Primary Examiner* — Flemming Saether
(74) *Attorney, Agent, or Firm* — Davidson, Davidson & Kappel, LLC

(57) ABSTRACT

In the case of a thread-tapping screw (1), especially a concrete screw (2), including a screw head (3), a screw shank (5) and a thread (6) that is formed on at least part of the screw shank (5), whereby at least one longitudinal groove (9) is formed on a front section (7) of the screw (1), starting at the end (4) of the screw on the screw shank (5), and the at least one longitudinal groove (9) is delimited on the screw shank (5) by two lengthwise sides (10) running essentially radially relative to a longitudinal axis (8) of the screw (1), it is the objective that the tightening torque needed when the screw (1) is being screwed into a drilled hole should be slight, and that the screw (1) should be produced cost-effectively. Each longitudinal groove (9), at least one lengthwise side (10) is oriented at an angle α between 1° and 20° relative to a straight line running parallel to the longitudinal axis (8) of the screw (1), and/or the at least one longitudinal groove (9) is configured on the screw shank (5) so as to be helical.

21 Claims, 4 Drawing Sheets

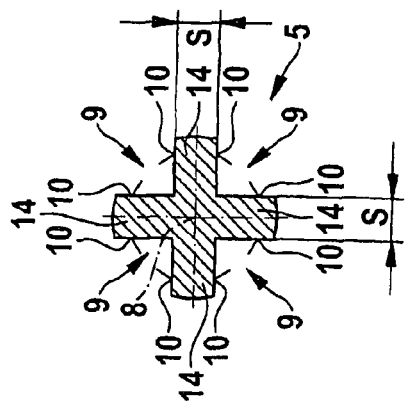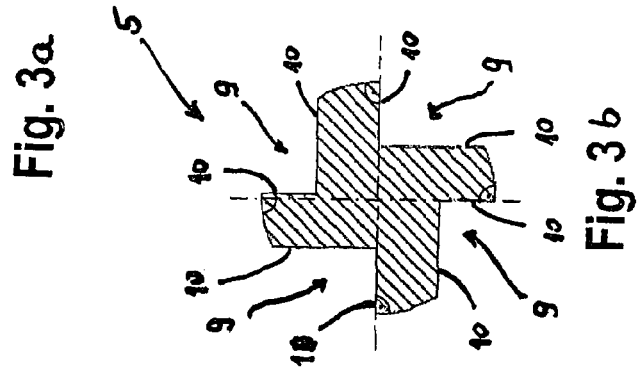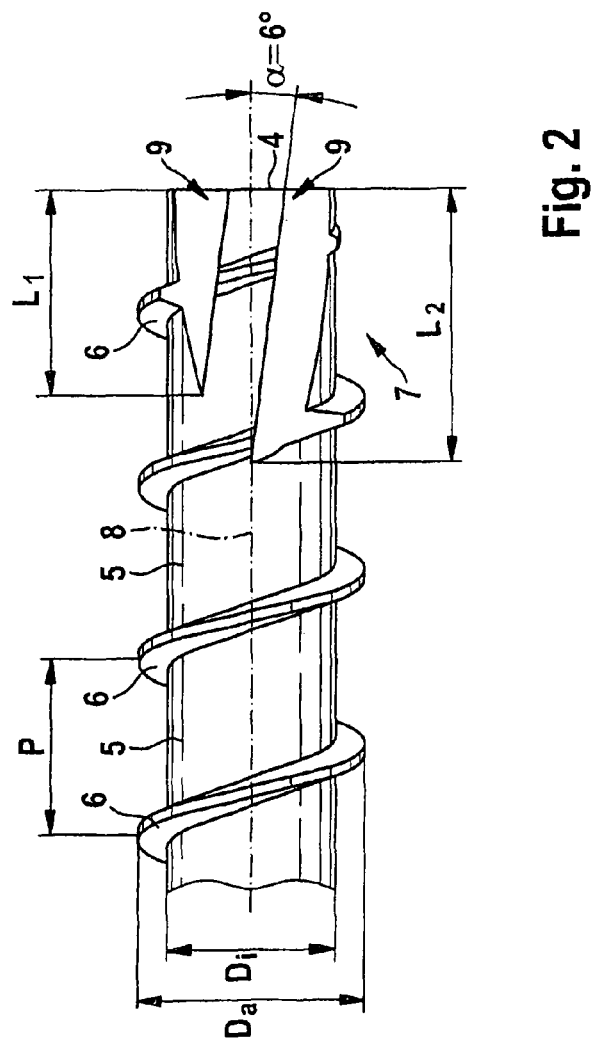

THREAD-TAPPING CONCRETE SCREW

This claims the benefit of German Patent Application DE 10 2010 028 824.1, filed May 10, 2010 and hereby incorporated by reference herein.

The present invention relates to a thread-tapping screw, and to a method for the production of a thread-tapping screw.

BACKGROUND

Thread-tapping concrete screws are screwed into holes drilled into a construction material, especially concrete, without the use of a plug. Here, the diameter of the drilled hole is greater than the core diameter of the screw and smaller than the outer diameter of the screw with the thread. Consequently, as the screw is being screwed in, especially by means of an impact driver, the screw works its way into the construction material in such a way that the thread taps or cuts a mating thread into the construction material. Therefore, the screw itself cuts the thread or mating thread needed for the required positive fit between the thread and the construction material.

European patent specification EP 1 795 768 B1 discloses a thread-tapping screw, especially a concrete screw, having a thread and a thread root, whereby the thread has interruptions that form cutting edges, the thread root is conically shaped in a front section of the screw, and the screw has a groove that runs in a lengthwise direction of the screw, that passes through the thread and that forms the interruptions, and that is deeper than the height of the thread, so that it extends into the thread root, whereby the depth of the groove decreases from the front end of the screw towards the end of the conical section of the thread root.

SUMMARY OF THE INVENTION

It is an objective of the present invention to provide a thread-tapping screw and a method for the production of a thread-tapping screw with which only a slight tightening torque is needed when the screw is being screwed into a drilled hole, and with which the screw can be produced cost-effectively.

The present invention provides a thread-tapping screw, especially a concrete screw, comprising a screw head, a screw shank and a thread that is formed on at least part of the screw shank, whereby at least one longitudinal groove is formed on a front section of the screw, starting at the end of the screw on the screw shank, and the at least one longitudinal groove is delimited on the screw shank by two lengthwise sides running essentially radially relative to a longitudinal axis of the screw, that is to say, with a deviation of less than 30°, 20° or 10° with respect to a radius, whereby, for each longitudinal groove, at least one lengthwise side is oriented at an angle $\alpha$ between 1° and 20° relative to a straight line running parallel to the longitudinal axis of the screw, and/or the at least one longitudinal groove is configured on the screw shank so as to be helical. The radius relative to the longitudinal axis is perpendicular to the longitudinal axis. Advantageously, a helical line of the at least one longitudinal groove is oriented in the same direction of rotation as a helical line of the thread. The pitch angle of the helical line of the at least one longitudinal groove is between 1° and 20°, preferably between 2° and 10°, especially between 3° and 8°.

When the thread-tapping screw is being screwed into a drilled hole, stone powder from the construction material is formed in the area of the end of the screw. The stone powder can result from the fact that it was not completely removed from the drilled hole after the hole was made and/or the stone powder is formed when the thread-tapping screw is being screwed into the drilled hole in the area of the end of the screw. The longitudinal grooves here form pockets to receive the stone powder between the screw shank and the wall of the drilled hole. Due to the orientation of at least one lengthwise side of the longitudinal groove at the angle $\alpha$ relative to the straight line, stone powder is conveyed in the longitudinal grooves from the area at the end of the screw in the direction of the screw head to a back area in the longitudinal grooves. In this manner, additional stone powder can once again be accommodated without any problem at the front end area of the at least one longitudinal groove at the end of the screw. This means that less stone powder or no stone powder is present in the interstice between the screw shank and the wall of the drilled hole, so that as a result, the friction between the screw and the wall of the drilled hole can be reduced, thereby considerably reducing the required tightening torque.

In particular, the angle $\alpha$ is between 2° and 10°, especially between 3° and 8°.

In another embodiment, both lengthwise sides of each longitudinal groove are at an angle $\alpha$ between 1° and 20° relative to a straight line running parallel to the longitudinal axis of the screw.

In a supplementary embodiment, the screw has several, especially equidistant, longitudinal grooves distributed along the circumference. The arrangement with four longitudinal grooves has proven to be particularly advantageous.

Preferably, the longitudinal grooves have different extensions in the axial direction.

In one variant, at least one thread is interrupted at the at least one longitudinal groove.

Advantageously, the cross section of the at least one longitudinal groove is L-shaped or V-shaped and/or the depth of the at least one longitudinal groove decreases, especially continuously, in the direction from the end of the screw towards the screw head.

Preferably, at least one lengthwise side of at least one longitudinal groove encloses a right angle with the screw shank, which means that the radial orientation and extension of this at least one lengthwise side runs through the central axis of the screw. This translates into a further optimization of the cutting and transporting effect of the longitudinal groove.

In another embodiment, the screw consists at least partially of metal, for instance, steel, or preferably of fiber-reinforced plastic, e.g. glass-fiber reinforced plastic (GRP).

A method according to the invention for the production of a thread-tapping screw, especially a screw described in this patent application, encompassing the following steps: providing a thread-tapping screw, particularly a concrete screw, comprising a screw head, a screw shank and at least one thread that is formed, at least partially, on the screw shank, creating at least one longitudinal groove at a front section of the screw, whereby at least one longitudinal groove is created in the screw shank at an angle $\alpha$ between 1° and 20° relative to a straight line running parallel to the longitudinal axis of the screw, and/or at least one longitudinal groove is created in the screw shank so as to be helical.

In another embodiment, the angle $\alpha$ is between 2° and 10°, especially between 3° and 8°.

Advantageously, the at least one longitudinal groove is created by cutting with a disk-shaped cutter that rotates around an axis of rotation, whereby, while the groove is being created, the axis of rotation is oriented at an angle $\alpha$ relative to a straight line that is oriented perpendicular to a lengthwise straight line running parallel to the longitudinal axis.

BRIEF DESCRIPTION OF THE DRAWINGS

An embodiment of the invention will be described in greater detail below with reference to the accompanying drawings. The following is shown:

FIG. 2: a partial side view of the screw according to FIG. 1;
FIGS. 3a, 3b: a cross section of the screw according to FIG. 1 on a front section, in an alternative configuration.

DETAILED DESCRIPTION

Figure 1:
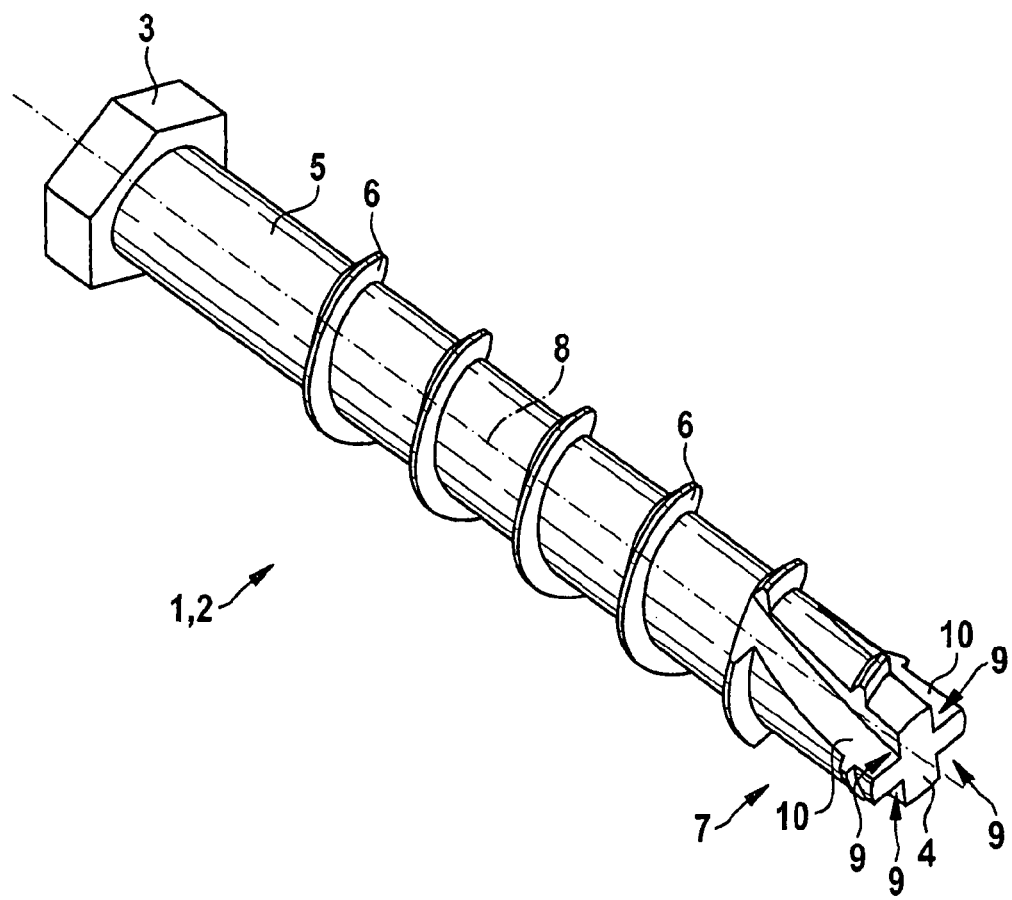
FIG. 1: a perspective view of a thread-tapping screw.

A thread-tapping screw 1 (FIG. 1) as a concrete screw 2 is intended to be screwed into a hole drilled in concrete. The screw 1 has a screw head 3, a screw end 4 and a thread 6 on a screw shank 5. Here, the screw shank 5 has a section that is configured without a thread 6, namely, a section in the area of the screw head 3 as a screw shank 5 without a thread 6 and a section on the screw end 4 as a screw shank 5 with a thread 6. The screw 1 has a root diameter $D_i$ of the screw shank 5 as well as an outer diameter $D_a$ on the thread 6. The thread 6 also has a pitch P, which corresponds to the distance between two windings of the thread 6 (FIG. 2).

A front section 7 of the thread-tapping screw 1 starts at the screw end 4 and runs in the direction of a longitudinal axis 8 of the screw 1 towards the screw head 3. The front section 7 here encompasses approximately two windings of the thread 6. Four longitudinal grooves 9 have been created in the front section 7 of the screw 1 (FIGS. 1 to 3 and 5). The longitudinal grooves 9 have two different lengths $L_1$ and $L_2$ in the direction of the longitudinal axis 8. Two longitudinal grooves 9 configured relative to the longitudinal axis 8 have a shorter length $L_1$, and two longitudinal grooves 9 located on the opposite side, likewise relative to the longitudinal axis 8, have a greater length $L_2$ (FIG. 2). In this context, the two longitudinal grooves 9 having the length $L_1$ interrupt only a first winding of the thread 6 and do not extend all the way to a second winding of the thread 6. Here, the longitudinal grooves 9 having the greater length $L_2$ interrupt a first as well as a second winding of the thread 6 starting at the screw end 4, and the longitudinal 9 having the greater length $L_2$ ends at the second winding of the thread 6 or in the area of the second winding of the thread 6, so that two windings of the thread 6 are interrupted by the longitudinal groove 9 having the length $L_2$ (FIGS. 1 and 2).

In a section perpendicular to the longitudinal axis 8 of the screw 1 in the front section of the screw 1, the screw shank 5 consists essentially of legs 14 oriented essentially perpendicular to each other (FIGS. 3a, 3b). Consequently, the longitudinal grooves 9 are present between these legs 14 having the thickness S. The longitudinal grooves 9 are delimited by two lengthwise sides 10 of the screw shank 5 or of the legs 14. The longitudinal groove 9 is configured essentially L-shaped here since both lengthwise sides 9 are oriented essentially perpendicular to each other, that is to say, with a deviation of less than 20° or 10°. The lengthwise sides 10 in the present example are oriented at an angle α of 6° relative to a straight line running parallel to the longitudinal axis 8 of the screw 1 (FIG. 2), although other angles between 1° and 20° are also possible. When the screw 1 is being screwed into a drilled hole (not shown here) in a construction material, the stone powder created in this process can thus be more easily conveyed in the longitudinal grooves 9 from a front end section of the longitudinal groove 9 at the screw end 4 towards the screw head 3, as a result of which less stone powder or no stone powder is present between the screw shank 5 and the wall of the drilled hole.

Figure 4:
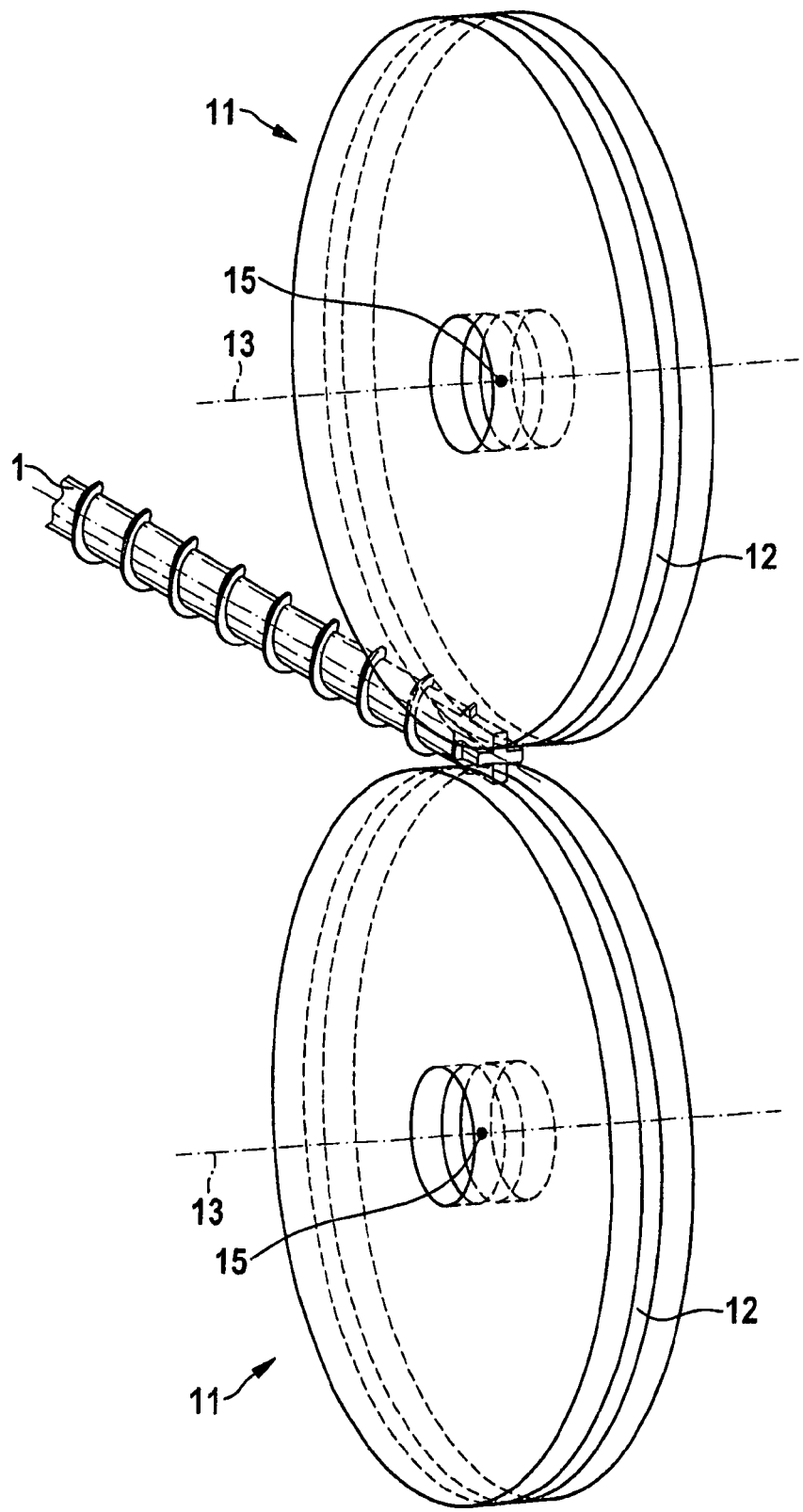
FIG. 4: a perspective view of two disk-shaped cutters and of the screw when the longitudinal grooves are being created.
Figure 5:
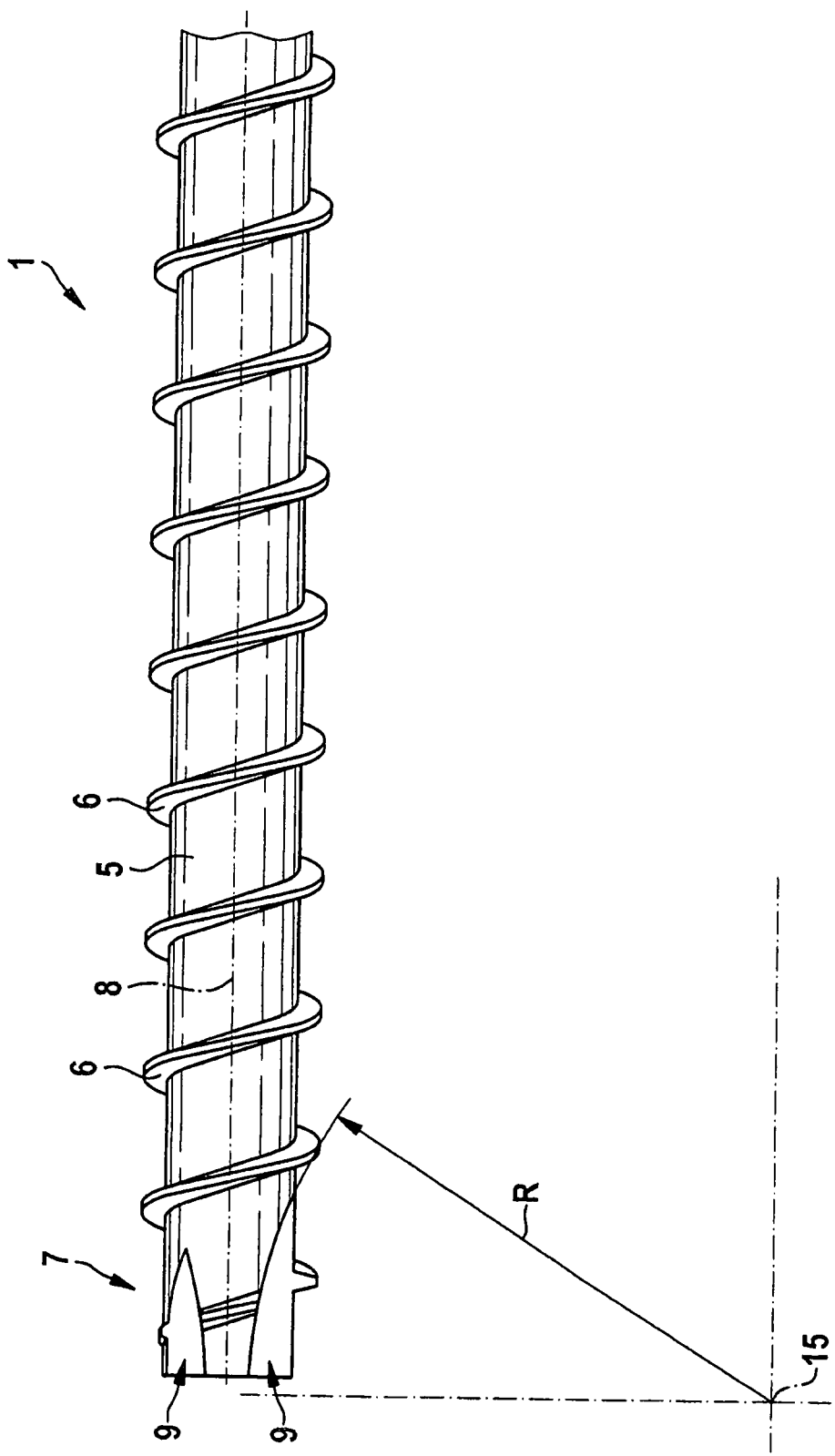
FIG. 5: a side view of the screw according to FIG. 1 and of a center of the disk-shaped cutter.

The screw 1 has four longitudinal grooves 9 oriented equidistantly relative to the circumference of the screw 1. The production or creation of these longitudinal grooves 9 is illustrated in FIGS. 4 and 5. Two disk-shaped cutters 11 have a machining ring 12 at their radial ends. The disk-shaped cutters 11 each rotate around an axis of rotation 13, so that a center 15 of the cutter 11 is formed in the center of the disk-shaped cutters 11. When the thread-tapping screw 1 is being produced, first of all, the thread-tapping screw 1 is provided without the longitudinal grooves 9. The two disk-shaped cutters 11 are arranged one above the other, so that the two machining rings 12 are at a distance from each other and the two axes of rotation 13 of the cutters 11 are oriented parallel to each other. The screw 1 is placed between the two machining rings 12 in such a way that two opposite pairs of longitudinal grooves 9 are created as a result of a relative movement between the screw 1 and the machining rings 12. The angle between the longitudinal axis of the screw 1 and the planes of the cutters 11 corresponds to the angle α of the longitudinal grooves 9 that have been created. If the screws 1 are inserted to a greater depth into the space between the two machining rings 12, a longitudinal groove 9 having a greater length $L_2$ is created, whereas, if the screws 1 are inserted to a lesser depth into the space between the machining rings 12, the longitudinal grooves 9 having a smaller length $L_1$ are created. In this context, the depth of the longitudinal grooves 9 decreases starting at the screw end 4 and going towards the screw head 3 since, owing to the radius R of the disk-shaped cutter 11, which has a circular cross section, the depth is created so as to decrease correspondingly (FIG. 5). A center 15 of the cutter 11 is oriented in one section with a sectional plane through the longitudinal axis 8 at a distance to a plane, whereby the plane is on the screw end 4, and moreover, the plane is perpendicular to the longitudinal axis 8 (FIG. 5).

In the example shown, the cutters 11 have the same radius; however, it is also possible to produce the longitudinal grooves 9 with cutters 11 that have different radii, especially with two identical pairs in which the cutters 11 having the same radius are arranged crosswise to each other.

FIG. 3b shows a section perpendicular to the longitudinal axis 8 of the screw 1 in the front area, in which the screw 1 was produced with such an irregular set of cutters 11.

The two alternatives depicted in FIGS. 3a and 3b made use of cutters 11 whose outer surfaces are arranged perpendicular to the lateral surfaces of the cutters 11. A possible alternative here, however, is to use cutters 11 whose outer surface is arranged at an angle other than 90° relative to the side surfaces. This results in longitudinal grooves 9 whose side surfaces 10 do not enclose a right angle, unlike the alternatives presented in FIGS. 3a and 3b.

All in all, the thread-tapping screw 1 entails considerable advantages. The thread-tapping screw 1 is easy and cost-effective to manufacture since the longitudinal grooves 9 can easily be created in the screw 1 by means of at least one disk-shaped cutter 11. Due to the orientation of the lengthwise sides 10 of the longitudinal grooves 9 relative to the longitudinal axis 8 of the screws 1, when the screw 1 is being inserted and screwed into a drilled hole, stone powder present in the area of the screw end 4 can be easily accommodated by the longitudinal grooves 9 and conveyed in the direction of the screw head 3.

What is claimed is:

1. A thread-tapping screw comprising:
a screw head;
a screw shank having a front section at an end opposite the screw head and a longitudinal axis; and
a thread formed on at least part of the screw shank,
the screw shank having four longitudinal grooves formed on the front section, starting at the end, each longitudinal groove delimited on the screw shank by two lengthwise sides running essentially radially relative to the longitudinal axis, each longitudinal groove having at least one lengthwise side of the two lengthwise sides oriented at an angle α between 1° and 20° relative to a straight line running parallel to the longitudinal axis, the other lengthwise side of the two lengthwise sides being formed as an arc with a radius R; wherein the four longitudinal grooves include first and second longitudinal grooves having first and second flat sides, respectively, the first and second flat sides being parallel, and include third and fourth longitudinal grooves having a third and fourth flat sides respectively, the third and fourth flat sides being parallel.

2. The screw as recited in claim 1 wherein the angle α is between 2° and 10°.

3. The screw as recited in claim 2 wherein the angle α is between 3° and 8°.

4. The screw as recited in claim 1 wherein the four longitudinal grooves are distributed along a circumference of the front section.

5. The screw as recited in claim 4 wherein the four longitudinal grooves are spaced equidistantly.

6. The screw as recited in claim 4 wherein a first groove of the four longitudinal grooves has a different extension in the axial direction with respect to a second groove of the four longitudinal grooves.

7. The screw as recited in claim 1 wherein the at least one thread is interrupted at at least one longitudinal groove of the four longitudinal grooves.

8. The screw as recited in claim 1 wherein the cross section of at least one longitudinal groove of the four longitudinal grooves is L-shaped or V-shaped or the depth of the at least one longitudinal groove decreases in a direction from the end towards the screw head.

9. The screw as recited in claim 1 wherein the at least one lengthwise side encloses a right angle with the screw shank.

10. The screw as recited in claim 1 wherein the screw includes at least partially of metal or fiber-reinforced plastic.

11. The screw as recited in claim 1 wherein the four longitudinal grooves include first and second longitudinal grooves having a shape obtainable by rotating a first tool around a first axis of rotation into the screw and include third and fourth longitudinal grooves having a further shape obtainable by rotating a second tool around a second axis of rotation into the screw.

12. The screw as recited in claim 11 wherein the angle α is between 2° and 10°.

13. The screw as recited in claim 12 wherein the angle α is between 3° and 8°.

14. The screw as recited in claim 11 wherein the four longitudinal grooves are distributed along a circumference of the front section.

15. The screw as recited in claim 14 wherein the plurality of longitudinal grooves are spaced equidistantly.

16. The screw as recited in claim 14 wherein a first groove of the plurality of longitudinal grooves has a different extension in the axial direction with respect to a second groove of the plurality of longitudinal grooves.

17. The screw as recited in claim 11 wherein the at least one thread is interrupted at at least one longitudinal groove of the four longitudinal grooves.

18. The screw as recited in claim 11 wherein the cross section of the at least one longitudinal groove is L-shaped or V-shaped or the depth of the at least one longitudinal groove decreases in a direction from the end towards the screw head.

19. The screw as recited in claim 11 wherein the at least one lengthwise side encloses a right angle with the screw shank.

20. The screw as recited in claim 11 wherein the screw includes at least partially of metal or fiber-reinforced plastic.

21. The screws as recited in claim 1 wherein the first and second flat sides are adjacent to each other and the third and fourth flat sides are adjacent to each other.

\* \* \* \* \*